(12) United States Patent
Hiraguchi et al.

(10) Patent No.: US 6,827,307 B2
(45) Date of Patent: Dec. 7, 2004

(54) RECORDING TAPE CARTRIDGE

(75) Inventors: Kazuo Hiraguchi, Kanagawa (JP); Wataru Iino, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 48 days.

(21) Appl. No.: 10/265,912

(22) Filed: Oct. 8, 2002

(65) Prior Publication Data

US 2003/0071157 A1 Apr. 17, 2003

(30) Foreign Application Priority Data

Oct. 15, 2001 (JP) ........................................ 2001-317294

(51) Int. Cl.[7] ........................................... G11B 23/107
(52) U.S. Cl. .................................... 242/348.2; 360/132
(58) Field of Search .............................. 242/348, 348.2; 360/132

(56) References Cited

U.S. PATENT DOCUMENTS 5,570,252 A   10/1996   Sumner et al.
6,034,839 A    3/2000   Hamming

*Primary Examiner*—John Q. Nguyen
(74) *Attorney, Agent, or Firm*—Sughrue Mion, PLLC

(57) ABSTRACT

A recording tape cartridge is disclosed. The cartridge includes an opening formed by notching a corner portion of the cartridge, which corner portion is at a side coming first when the cartridge is mounted in a drive. Through the opening, a leader pin and a magnetic tape are drawn out via the shortest path. When a handling portion disposed at one of ends of a shield portion is moved along a direction in which the cartridge is mounted, the shield portion moves so as to go around the outside of pin seats and a reel while rotating around the one end to open or close the opening.

21 Claims, 12 Drawing Sheets

F I G . 4
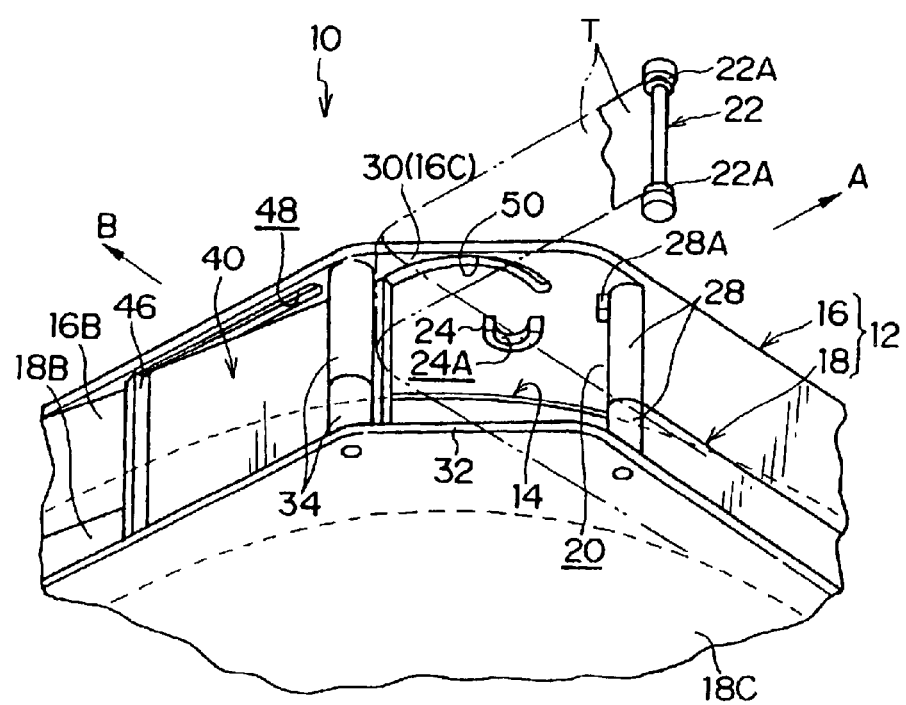

RECORDING TAPE CARTRIDGE

BACKGROUND OF THE INVENTION

1. Field of the Invention

The present invention relates to a recording tape cartridge rotatably accommodating a single reel, around which a recording tape such as a magnetic tape is wound.

2. Description of the Related Art

Conventionally, magnetic tape cartridges have been known in which a magnetic tape, which is used as a data recording/playback medium of a computer or the like, is wound on a single reel, and the reel is accommodated within a case. A leader member, which is a leader pin, a leader tape, or a leader block, for example, is provided at the distal end of the magnetic tape. A pull-out means provided at a drive device pulls out the leader member from an opening of the magnetic tape cartridge, and the magnetic tape fixed to the leader member is wound onto a take-up reel of the drive device.

A reel gear is carved in a ring shape at the center of the bottom surface of the reel which emerges from an opening formed in the bottom surface of the magnetic tape cartridge. Due to a driving gear, which is provided at a rotating shaft of the drive device, meshing with the reel gear, the reel is driven to rotate. Further, due to the reel of the magnetic tape cartridge and the take-up reel of the drive device being rotated synchronously, data can be recorded onto the magnetic tape or data recorded on the magnetic tape can be played back.

A large amount of information can be recorded in this magnetic tape cartridge, although little space is needed to accommodate the magnetic tape cartridge when it is stored. As shown in FIGS. 10 through 12, the position of the opening of the magnetic tape cartridge and the type of door for opening and closing the opening differ in accordance with the type of the leader member. Namely, in the case of a leader pin 108, as shown in FIG. 10, an opening 104 is formed in a side wall 102A of a case 102 which side wall 102A is parallel to the direction of loading the magnetic tape cartridge into a drive device (the direction of arrow A). The opening 104 is opened and closed by a door 106 which slides in the same direction as the loading direction.

However, if the opening 104 is provided at the side wall 102A of the case 102 in this way, the pull-out means of the drive device must pull the leader pin 108 out from the left-right lateral direction of the case 102 (i.e., non-rectilinearly). Thus, space for the pull-out means to move around the case 102 must be ensured in the left-right lateral direction of the case within the drive device, and the mechanism for moving the pull-out means around (i.e., non-rectilinearly) becomes complex. In other words, the drawback arises that the drive device becomes large. Moreover, there is the problem that the path along which a magnetic tape T is pulled out becomes long.

Further, in the case of a leader tape T, as shown in FIG. 11, an opening 116 is formed in a front wall 114A of a case 114 which front wall is orthogonal to the direction of loading the magnetic tape cartridge into a drive device (the direction of arrow A). A door 118, which opens and closes the opening 116, is a pivoting-type door which pivots toward the front around a shaft supported in a vicinity of a corner of the case 114. However, if the opening 116 is provided at the front wall 114A of the case 114 in this way, although there is no need for the pull-out means of the drive device to move non-rectilinearly, the door 118 opens over a wide area toward the front. Therefore, space must be ensured within the drive device such that nothing interferes with the door 118 when the opening 116 is to be opened. In short, a drawback arises in that the drive device becomes large.

Moreover, in the case of a leader block 126, as shown in FIG. 12, an opening 124 is formed by diagonally cutting off a corner portion of the front side of the case in the direction of loading the magnetic tape cartridge into the drive device. The opening 124 is opened and closed directly by the leader block 126. However, if the opening 124 is opened and closed by the leader block 126 in this way (namely, if the leader block 126 also functions as the door for opening and closing the opening), a problem arises in that it is easy for the leader block 126 to become scratched or dirtied. Specifically, the leader block 126 fits together with a reel hub 130 of the drive device and forms a portion of the reel hub 130. Thus, if a scratch is formed in or dirt adheres to the leader block 126, even if the scratch or dirt is a scratch or dirt which is not problematic when the leader block 126 is ordinarily used as the door, it may become difficult for the leader block 126 to fit-together with the reel hub 130, and there is the possibility that problems in the moving of the magnetic tape T may arise.

Further, since the leader block 126 forms a part of a winding surface for winding the magnetic tape T, the above-described damage or contamination may damage the data recorded on the magnetic tape T or may create damaged areas on the magnetic tape T where data cannot be recorded.

Furthermore, since the leader block 126 is merely anchored at the edge of the opening 124, the leader block 126 may come off when the case 122 is dropped. Moreover, since the size of the leader block 126 is larger than the size of the leader pin, many constraints are imposed on the form of the case 122.

SUMMARY OF THE INVENTION

In view of the aforementioned, an object of the present invention is to provide a recording tape cartridge in which an opening, which is adapted to minimize a distance of a path for drawing out a recording tape, can be opened or closed by a shielding member, which allows to reduce a space in a drive for accommodating the cartridge, without interfering with a reel and a leader member, as well as a structure of an opening/closing device of the drive, which operates the shielding member to open or close the opening, can be simplified.

In order to accomplish the above-described object, a recording tape cartridge according to the invention comprises: a rectangular case; an opening through which a leader member is drawn out; a shielding member for opening and closing the opening; and a handling portion disposed at an end portion of the shielding member. The case rotatably accommodates a single reel, around which a recording tape is wound. The opening is formed by notching one of corner portions of the case at a side coming first when the case is mounted in the drive, and the leader member is attached at an end of the recording tape. The shielding member is disposed at the case, and one of ends of the shielding member is movable outside side walls of the case along a mounting direction in which the case is mounted in the drive. The shielding member is movable along the mounting direction while engaging with the opening/closing member of the drive during an operation to mount the case in the drive.

Since the opening is formed by notching the corner of the rectangular case at the side coming first when the case is mounted, an open plane is oriented in the mounting direction in which the case is mounted in the drive as well as in a direction perpendicular to the mounting direction. In other words, the open plane is inclined with respect to the mounting direction. Therefore, a drawing device can access the leader member in the mounting direction, in the direction perpendicular to the mounting direction, or from a side of the corner of the case, i.e., in a direction perpendicular to the inclined open plane.

This allows a design of the drive in which a distance of a path for drawing out the recording tape is minimized. Further, since there is no need of a driving mechanism for driving the drawing device so as to move around to hold or fix the leader member, a compact and low-cost drive can be designed.

Further, since the one end portion of the shielding member moves outside the side wall of the case along the mounting direction to open or close the opening which is inclined with respect to the mounting direction, in other words, since the shielding member moves around the outside of the leader member and the reel while rotating around the one end portion thereof to open or close the opening, a range of movement (a track of movement) of the shielding member does not extend, by an mount exceeding its thickness, beyond the notched portion of the case being notched for forming the opening (if the notched portion is not provided, an outline area of the rectangular case).

Therefore, a space in the drive for accommodating the recording tape cartridge is small, and the track of movement of the shielding member does not interfere with the leader member and the reel in the case. Further, since the shielding member moves outside the case, an inside structure of the case can be simplified.

In addition, by disposing the opening/closing member of the drive so that it can engage with the handling portion disposed at the one end portion of the shielding member and movable along the mounting direction, the opening can be opened simply through the operation of mounting the recording tape cartridge (the case) in the drive, and this allows to simplify a structure of the opening/closing device including the opening/closing member. Moreover, since the shielding member, including the handling portion disposed thereto, moves outside the side wall of the case, there is no need of an opening (such as a slit) for exposing the handling portion so as to be movable to the outside of the case, as there is in a structure in which the shielding member moves within the case, and dust-tightness of the case can be increased with a simple structure.

As described above, in the recording tape cartridge of the invention, the opening, which is adapted to minimize a distance of a path for drawing out the recording tape, can be opened or closed by the shielding member, which allows reduction in a space in the drive for accommodating the cartridge, without interfering with the reel and the leader member, and a structure of the opening/closing device of the drive, which operates the shielding member to open or close the opening, can be simplified.

When the distance of the path for drawing out the recording tape is minimized as described above, a path of the recording tape is also shortened. This allows a reduction in a contact abrasion between the recording tape and a tape guide. Further, as described above, when the opening is formed by notching the corner portion of the case, a range of accessible directions of the drawing device to the leader member is widened. Therefore, a range of possible positions of the leader member in the case is widened, thereby increasing a degree of freedom in designing the drive. Since the shielding member operates as described above, the possible positions of the leader member are not affected by the shielding member, that is, the range of the possible positions of the leader member is not narrowed.

Since the shielding member is provided separately from the leader member which is drawn out from the case and need not be removed from the case, it can be designed so as not to easily come off with a drop impact. When the recording tape is not used, the leader member is accommodated in the case whose opening is closed by the shielding member, and therefore is not likely to be damaged or dirtied. Therefore, it does not affect drawing or running of the recording tape in the drive, and does not damage the recording tape.

BRIEF DESCRIPTION OF THE DRAWINGS

FIG. 4 is a perspective view showing the recording tape cartridge according to the embodiment of the invention, viewed from below, in a state in which the opening of the cartridge is open.

DESCRIPTION OF THE PREFERRED EMBODIMENTS

A recording tape cartridge 10 according to an embodiment of the present invention will now be described on the basis of FIGS. 1–8C. A schematic overall structure of the recording tape cartridge 10 is described first. An opening 20 and a door 40, which serves as a shielding member for opening and closing the opening 20, are described next. It should be noted that, for convenience of explanation, a direction in which the recording tape cartridge 10 is mounted in a drive indicated by arrow A is referred to as a forward direction or a front side of the recording tape cartridge 10, and a direction perpendicular to arrow A, i.e., a direction of arrow B is referred to as a rightward direction.

(Overall Structure of Recording Tape Cartridge)

Figure 1:
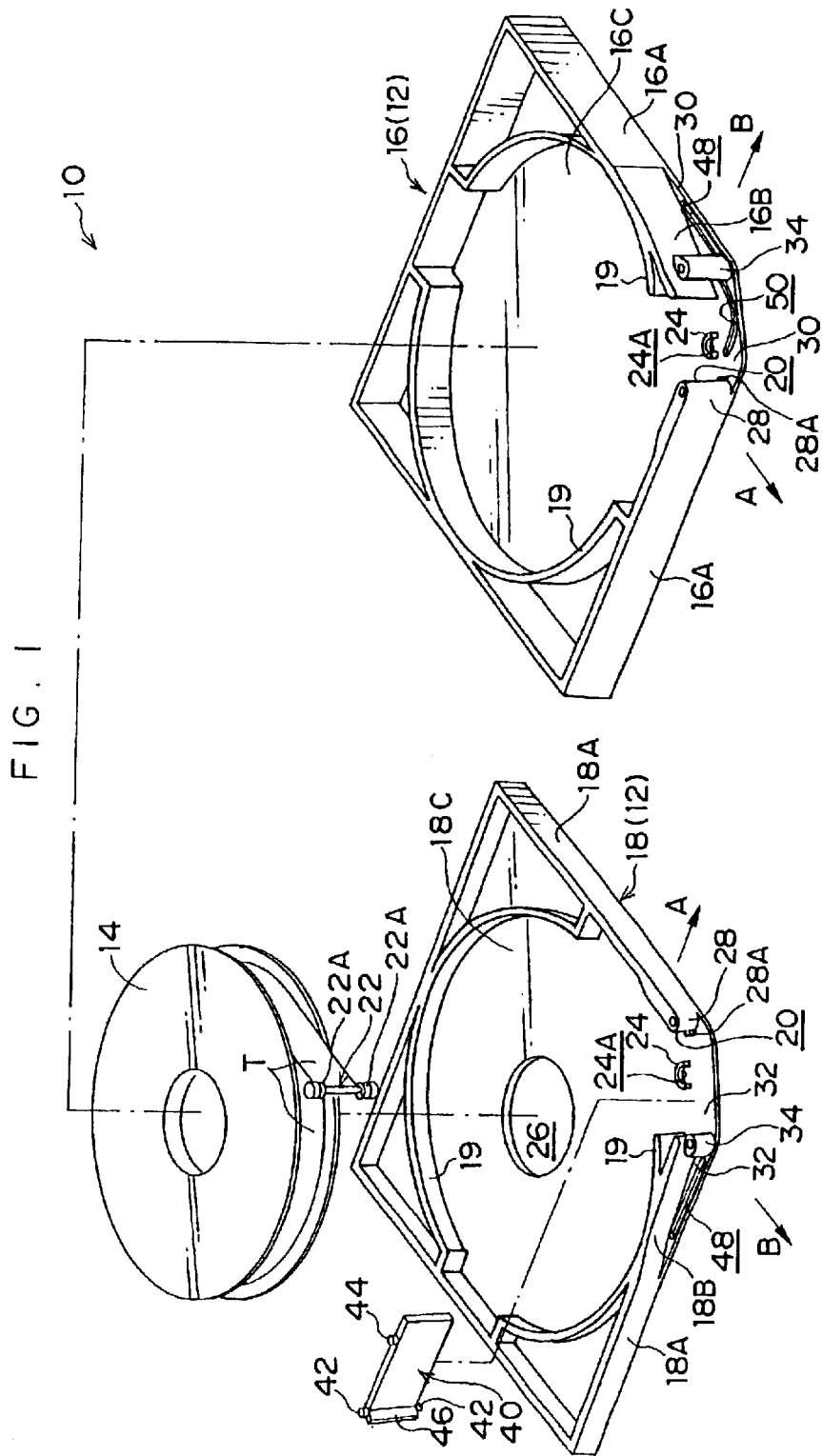
FIG. 1 is an exploded perspective view showing an overall structure of a recording tape cartridge according to an embodiment of the present invention.

As schematically shown in an exploded perspective view of FIG. 1, the recording tape cartridge 10 includes a case 12, which is substantially rectangular when viewed from above. The case 12 rotatably accommodates a single reel 14. A magnetic tape T, which is an information recording/reproducing medium or a recording tape, is wound around the single reel 14.

The case 12 comprises an upper case 16 and a lower case 18, each of which is provided with a notch at one of corner portions thereof, being joined together. The corner portion is located at a side which comes first when the cartridge 10 is mounted in the drive, and may be regarded as a portion formed by cutting the peripheral wall 16A of the upper case 16 and the peripheral wall 18A of the lower case 18. The case 12 has a space therein for accommodating the reel 14, around which the magnetic tape T is wound. The corner portion serves as an opening 20, through which the magnetic tape T is drawn out.

A leader pin 22 is connected to a free end of the magnetic tape T drawn out through the opening 20. The leader pin 22 is anchored at or engaged with a drawing device of the drive to be drawn out. An annular groove 22A is formed at each of ends of the leader pin 22 projecting beyond width-directional ends of the magnetic tape T. The annular grooves 22A are anchored, for example, at hooks of the drawing device. Thus, the hooks do not contact and damage the magnetic tape T when the magnetic tape T is drawn out.

Further, a pair of upper and lower pin seats 24 for positioning and holding the leader pin 22 in the case 12 are disposed at the case 12 inside and in the vicinity of the opening 20. The pin seats 24 are semi-cylindrical and the ends of the leader pin 22 in an erected state are held in depressions 24A of the pin seats 24. Circumferential walls of the pin seats 24 are open at a side toward the opening 20, serving as an entrance for the leader pin 22.

Furthermore, a gear opening 26 for exposing a reel gear (not shown) of the reel 14 to the outside is provide at a center of the lower case 18. The reel gear meshes with a driving gear of the drive to rotationally drive the reel 14 in the case 12. Moreover, the reel 14 is held by restraining walls 19 so as not to run out. The restraining walls 19 are provided so as to partially project from inner surfaces of the upper case 16 and the lower case 18, and are located on a circular locus coaxial with the gear opening 26.

(Structure of Opening)

Figure 2:
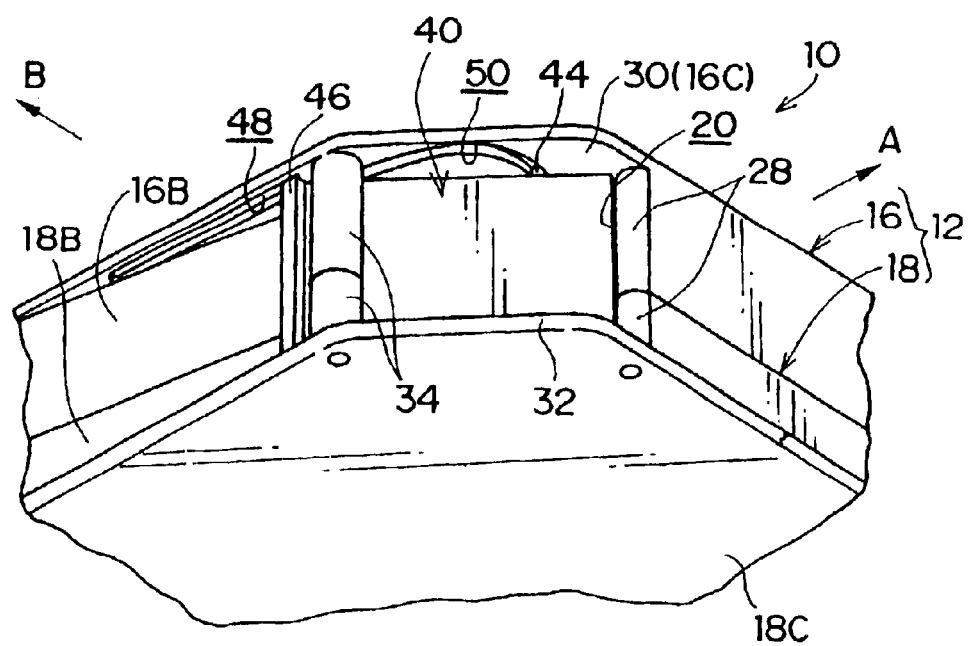
FIG. 2 is a perspective view showing the recording tape cartridge according to the embodiment of the invention, viewed from below, in a state in which an opening of the cartridge is closed with a door.
Figure 3:
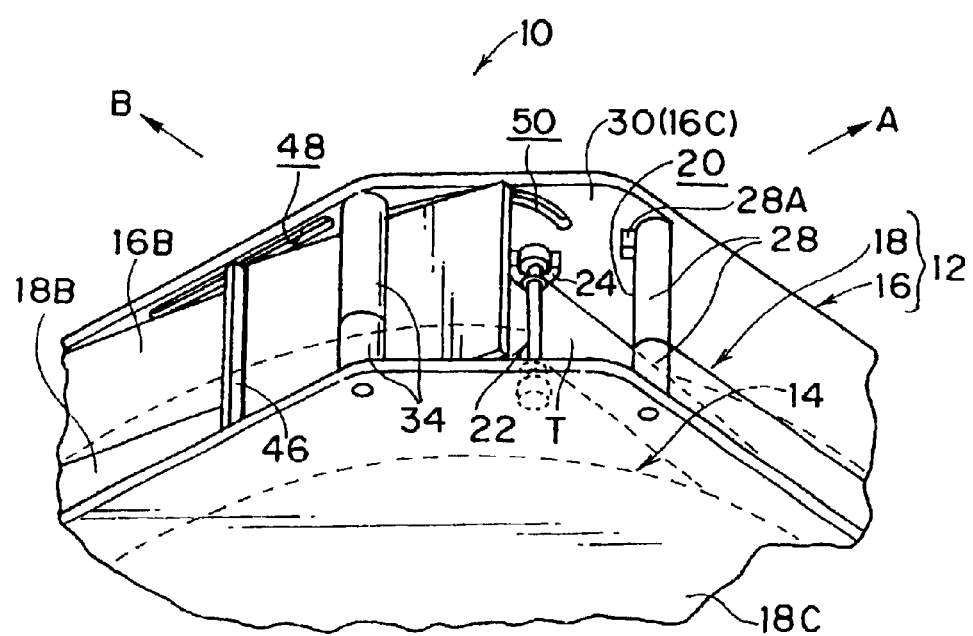
FIG. 3 is a perspective view showing the recording tape cartridge according to the embodiment of the invention, viewed from below, in a state in which the opening of the cartridge is in a course of being opened or closed.

As shown in FIGS. 2–4, the opening 20 is formed by notching the case 12 at the front-right corner portion thereof as described above, and the open plane thereof is oriented in directions of arrows A and B. Therefore, the drawing device of the drive can access the leader pin 22 from a side in the direction of arrow A or arrow B, or between arrows A and B, to position and hold the leader pin 22.

Thus, a range of possible positions of the pin seats 24 for holding the leader pin 22 is widened. Since an area in which the drawing device of the drive can position and hold the leader pin 22 is wide, positions of the pin seats 24 can be set according to specifications of the drive which catches the pin 22 from the side in the direction of arrow A or arrow B. Therefore, a degree of freedom in designing the drive is increased.

Figure 5:
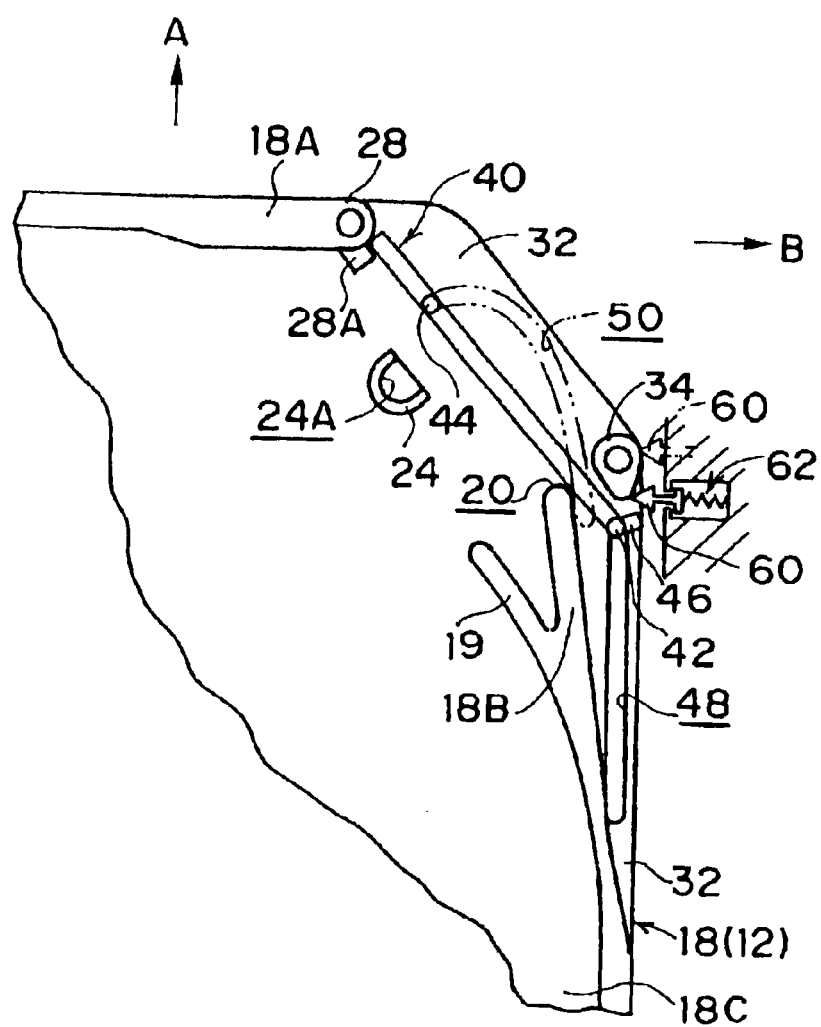
FIG. 5 is a plan view showing the recording tape cartridge according to the embodiment of the invention without an upper case in a state in which the opening of the cartridge is closed with a door.
Figure 6:
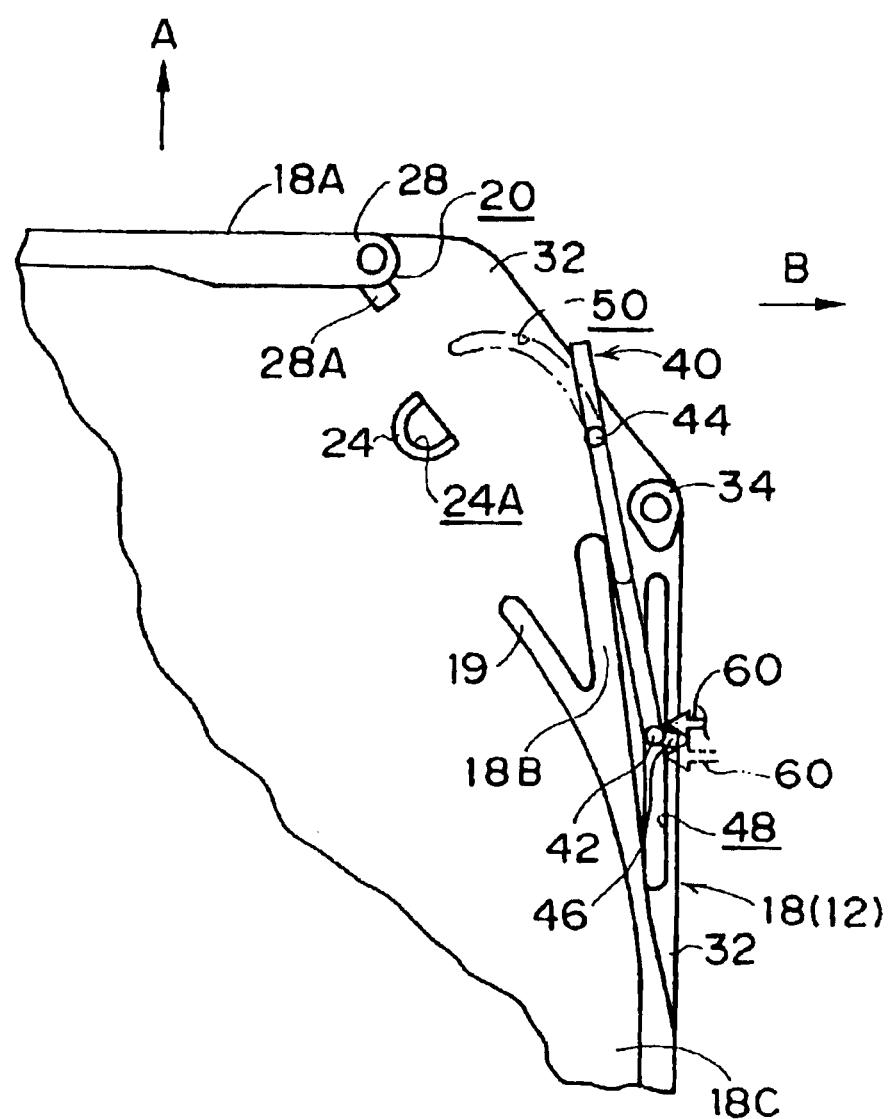
FIG. 6 is a plan view showing the recording tape cartridge according to the embodiment of the invention without the upper case in a state in which the opening of the cartridge is in course of being opened or closed.
Figure 7:
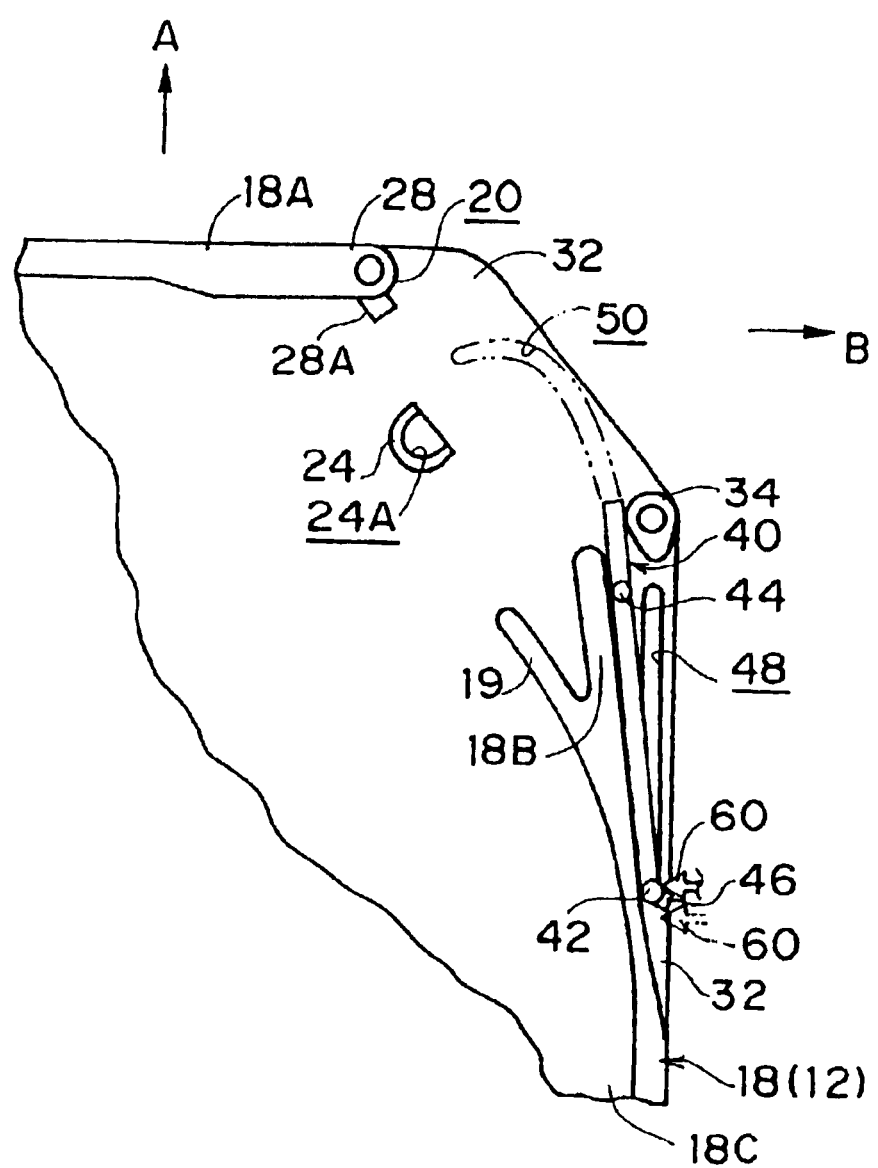
FIG. 7 is a plan view showing the recording tape cartridge according to the embodiment of the invention without the upper case in a state in which the opening of the cartridge is open.

As shown in FIGS. 5–7, front and back edges of the opening 20 are defined by a pair of upper and lower machine screw bosses 28 and free ends (front ends) of inclined side walls 16B and 18B. The pair of upper and lower machine screw bosses 28 are provided at terminal end portions of the peripheral walls 16A and 18A respectively oriented in the direction of arrow A. Substantially front-half portions of the peripheral walls 16A and 18A along the direction of arrow A are slightly offset inward with respect to the case 12 to form the inclined side walls 16B and 18B. Stoppers 28A, slightly projecting toward the terminal end portions of the inclined side walls 16B and 18B, are disposed inside the machine screw boss 28 at the terminal ends of the peripheral walls 16A and 18A in the vicinity of the machine screw bosses 28. The stoppers 28A are provided to abut on a door 40 described later.

A top plate 16C of the upper case 16 and a bottom plate 18C of the lower case 18 extend outward beyond the front and back edges of the opening 20, and ends thereof form a pair of upper and lower tongues 30 and 32, which are substantially parallel to an imaginary line connecting the front and back edges of the opening 20. The tongues 30 and 32 reach outer sides of the inclined side walls 16B and 18B along outer surfaces of the peripheral walls 16A and 18A along the direction of arrow A. It should be noted that back ends of the inclined side walls 16B and 18B are in a circular arc shape having right end portions of the tongues 30 and 32 as tangential lines. Further, the inclined side walls 16B and 18B are smoothly integrated with the outer surfaces of the peripheral walls 16A and 18A along the direction of arrow A, and the restraining walls 19 are integrally formed on inner sides of the inclined side walls 16B and 18B.

A pair of upper and lower machine screw bosses 34 is disposed on the tongues 30 and 32 so as to stand in the vicinity of the inclined side walls 16B and 18B. The machine screw bosses 34 are spaced apart by a predetermined distance from the end portions of the inclined side walls 16B and 18B defining the edges of the opening 20. The predetermined distance is set greater than a thickness of the door 40 described later. Farther, back-half portions of the machine screw bosses 34 are in a triangular shape when viewed from above which is substantially symmetrical with respect to the direction of arrow A and has an apex angle of about 60 degrees.

A machine screw (not shown) is screwed from below in each of the machine screw bosses 28 and 34 in the vicinity of the edges of the opening 20, to fix (join) the upper and lower cases 16 and 18 together. Thus, being defined by the peripheral walls 16A and 18A as well as the free ends of the inclined side walls 16B and 18B, corner portions at both ends of the opening 20, which are less strong than other portions and are likely to impinge on a hard ground or floor when the cartridge 10 is dropped, are firmly joined. Even if the cartridge 10 is dropped, the above-described structure of the cartridge 10 does not deform nor buckle to cause displacement due to a weight of the overall cartridge 10.

It should be noted that a diameter of thread ridge of the machine screw is, for example, 2.0 mm, and outside diameters of the front-half portions of the machine screw bosses 28 and the machine screw bosses 34 are 4.0 mm. Further, instead of using the machine screw, a projection may be formed at the upper case 16 at a position corresponding to the machine screw boss 28 and a fitting hole for receiving the projection may be formed at the lower case 18 for fitting the projection in the fitting hole. In this case, the upper case 16 and the lower case 18 are often joined together by a machine screw at a position within a 30 mm-radius from the fitting site. Further, abutted surfaces of the peripheral walls 16A and 18A (corner portions at both sides of the opening 20) may be welded together. In this case, a strength member corresponding to the machine screw bosses 34 is often provided. A reference portion which serves as a reference for positioning in the drive may be provided immediately below the strength member.

Further, in the area where the pin seats 24 are disposed (in the vicinity of the opening 20), a thickness of the upper case 16 and that of the lower case 18 are both 2 mm and thicker than other areas. Furthermore, the case 12 (the upper case 16 and the lower case 18) is made of a polycarbonate material (PC). It should be noted that a thickness of a bottom portion of a first guide groove 48 (described later) and that of a second guide groove 50 (described later) range from 0.5 mm to 1 mm.

This increases a strength of the area in the vicinity of the pin seats 24 where the leader pin 22 is held (positioned), thereby preventing displacement caused by, for example, a drop impact. It can be regarded most important in functional terms of the recording tape cartridge 10 that the leader pin 22 should be correctly anchored by the drawing device when the recording tape is drawn out.

An inclination of an open plane of the opening 20 with respect to the direction of arrow A is determined depending on requirements in identification of the recording tape cartridge 10 in a library device. The library device accommodates a plurality of recording tape cartridges 10, and mounts or dismounts the recording tape cartridge 10 in or from the drive automatically, i.e., without involving an operator's operation. If the library device handles several types of recording tape cartridges 10 and drives, the library device needs to identify a generation, a recording capacity, and the like, of each recording tape cartridge 10. The inclination of the open plane of the opening 20 can be utilized for this identification.

Thus, the inclination of the open plane of the opening 20, which opening is used for drawing out the magnetic tape T and is reinforced as described above, can be used as an identity feature for identification of the recording tape cartridges 10 by the library device. The inclination of the open plane is specifically an inclination of the top plate or the bottom plate defining the upper or lower edge of the opening 20. Since the opening 20 also serves as the identity feature, problems such as insufficient strength of the case 12, lowering of dust-tightness and increasing complexity of a structure of a metal mold are prevented, which would be concerned if the identity feature was provided separately from the opening 20, for example, if one or more through holes were provided as the identity feature in the case 12.

(Structure of Door)

The above-described opening 20 is opened or closed with the door 40 serving as the shielding member. The door 40 has a rectangular tabular shape, whose width (a height with respect to the case 12) is about the same as an opening height of the opening 20 and whose length is greater than an opening width of the opening 20. That is, the door 40 is formed so that it can close the opening 20.

The door 40 includes a pair of (first) upper and lower guide pins 42 at one of longitudinal-direction ends thereof, each projecting from each of width-direction ends of the door 40 (upward and downward with respect to the case), as well as a (second) guide pin 44 in the vicinity of the other of the longitudinal-direction ends, projecting from the upper end of the door 40. Further, a handling portion 46, which engages with an opening/closing device of the drive, is provided at an outer surface of the end of the door 40, at which the guide pins 42 are disposed, so as to extend across the width of the door 40.

While the case 12 is made of PC, the door 40 is, for example, an integrally molded polyoxymethylene (POM) resin, which is excellent in abrasion resistance and has a low friction coefficient. The guide pins 42 and 44 may be formed separately from the main body of the door 40. In this case, a resin material such as polyamide (PA), polytetrafluoroethylene (PTFE) or polyethylene (PE), or a metallic material, or a material containing one or more of these materials as a main component may be used. Instead of PC, the case 12 can be made of acrylonitrile butadiate styrene (ABS) or a metallic material. If the case 12 is made of a metallic material, the guide pins 42 and 44 are often made of a resin material in consideration of abrasion resistance and prevention of noise.

The door 40 can be moved between a position for closing the opening 20 and a position for opening the opening 20 by a guiding device disposed at the case 12A.

Specifically, a pair of upper and lower first guide grooves (cam grooves) 48, opposed to each other, is provided along the direction of arrow A at the tongues 30 and 32 in areas outside the inclined side walls 16B and 18B of the upper and lower cases 16 and 18. Base ends (front ends) of the first guide grooves 48 are located slightly behind the machine screw bosses 34, and lengths of the first guide grooves 48 are slightly shorter than the length of the door 40. The upper and lower guide pins 42 are respectively placed in the upper and lower first guide grooves 48 to be guided along the grooves.

A second guide groove (cam groove) 50, curved to bulge toward the outside of the opening 20, is provided at the tongue 30 of the upper case 16. A base end (front end) of the second guide groove 50 is located in the vicinity of the machine screw boss 28 (a position corresponding to a distance between the other end of the door 40 and the guide pin 44), and a terminal end (back end) thereof is located slightly inward from the front end of the first guide groove 48. The second guide groove 50 is curved in a form of non-circular arc having a large curvature at a position corresponding to the center of the opening 20. The guide pin 44 is placed in the second guide groove 50 to be guided with being rotated around the guide pins 42.

Figure 8A:
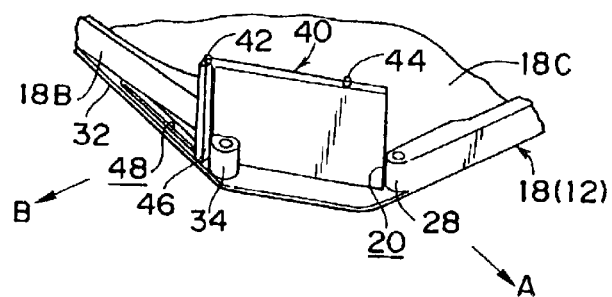
FIG. 8A is a perspective view showing a process of opening the opening of the recording tape cartridge according to the embodiment of the invention, particularly in a state in which the opening is closed.

Thus, the door 40 closes the opening 20 from the outside, with its one end abutting on the free ends of the inclined side walls 16B and 18B and the other end abutting on the stoppers 28A in a state in which the guide pin 44 is positioned at the front end of the second guide groove 50 and the guide pins 42 are positioned at the front ends of the first guide grooves 48 (see FIGS. 2, 5 and 8A).

It should be noted that, in this state, the one end of the door 40 is positioned behind the machine screw bosses 34, and the handling portion 46 is oriented slightly inward than the direction of arrow A (a direction opposite to the direction of arrow B). The handling portion 46 is formed so as not to project outward beyond right ends of the tongues 30 and 32 or the machine screw bosses 34.

Figure 8B:
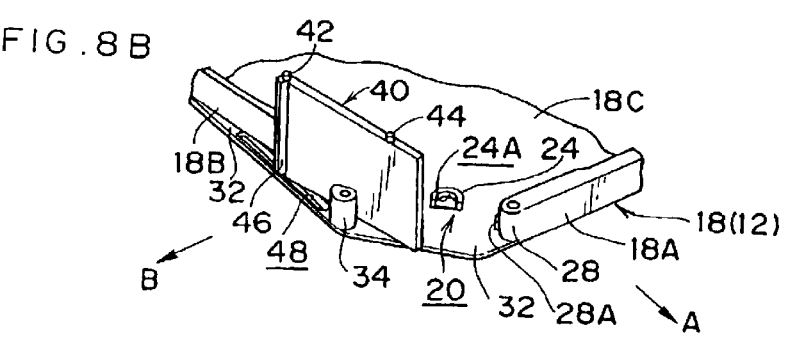
FIG. 8B is a perspective view showing the opening of FIG. 8A in course of being opened or closed.
Figure 8C:
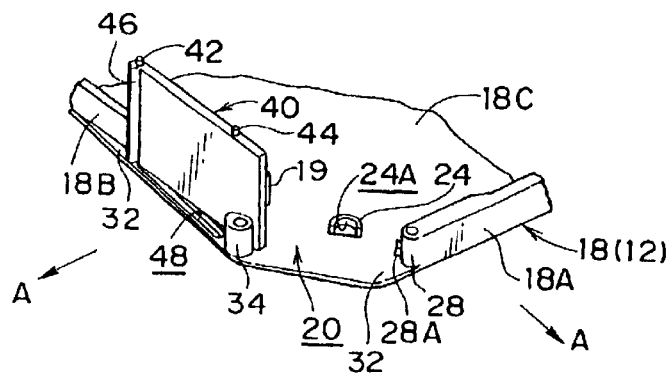
FIG. 8C is a perspective view showing the opening of FIG. 8A in the open state.

According to the structure shown in FIGS. 3, 6 and 8B, when the handling portion 46 is moved backward by the opening/closing device of the drive, the guide pins 42 and 44 are respectively guided by the first and second guide grooves 48 and 50. Then, the door 40 slides backward through between the inclined side walls 16B and 18B and the machine screw bosses 34, and between the tongues 30 and 32, while rotating around the guide pins 42 clockwise when viewed from above. Then, in a state in which the guide pin 44 is positioned at the back end of the second guide groove 50 and the guide pins 42 are positioned at the back ends of the first guide grooves 48, the door 40 is positioned outside the case 12 substantially in parallel with the inclined side walls 16B and 18B to open the opening 20 (see FIGS. 4, 7 and 8C).

When the opening 20 is open and the handling portion 46 is moved frontward (in the direction of arrow A) by the opening/closing device of the drive, the guide pins 42 and 44 are respectively guided by the first and second guide grooves 48 and 50. The opening 20 is closed with the door 40 by reversing the operation of opening the opening 20.

In order to smoothly move the door 40, a clearance, when centers of the guide pins 42 and 44 are aligned with center lines (in width directions) of the first and the second guide grooves 48 and 50, may be about 0.05–0.4 mm for each side or about 0.1–0.8 mm for both sides. Particularly, the clearance of 0.2 mm allows smooth movement of the door 40 while preventing chattering of the door 40. Further, a clearance between upper and lower end surfaces and the tongues 30 and 32 may be about 0.05–0.2 mm for each side.

Since the door 40 is not urged in a direction for closing the opening 20, there is no need of providing an urging device (nor a space for placing the urging device). The case 12 is structured so that the opening 20 can be formed by notching a large area of the front-right corner portion of the case 12. That is, a size of the opening 20 can be enlarged, and a range of the possible positions of the pin seats 24 can be further expanded.

Further, since the door 40 is placed outside the inclined side walls 16B and 18B when the opening 20 is open, the inclined side walls 16B and 18B and the restraining walls 19 can be integrated in the vicinity of the opening 20 as described above, thereby increasing the strength of the case 12 in the vicinity of the opening 20. The strength of the case 12 is further increased by increasing the thicknesses of the inclined side walls 16B and 18B for there is no need of providing an urging device around there.

Next, operation of the embodiment is described.

In the recording tape cartridge 10 having the above-described structure, the opening 20 is closed with the door 40 from the outside when the cartridge 10 is not used (such as when stored or carried). Specifically, the one end of the door 40 abuts on the free ends of the inclined side walls 16B and 18b, and the other end thereof abuts on the stoppers 28A to close the opening 20 from the outside.

When the magnetic tape T is used, the recording tape cartridge 10 is mounted in the drive along the direction of arrow A. Along with this mounting operation, as shown in FIG. 5, an engaging pin 60, which serves as an opening/closing member included in the opening/closing device of the drive, engages with the handling portion 46 of the door 40.

Specifically, the engagement of the engaging pin 60 is effected as follows: the engaging pin 60 is supported by the drive so as to be movable in a direction perpendicular to the direction of arrow A (in the direction of arrow B and a direction opposite to it), and is urged in the direction opposite to the direction of arrow B by an urging member such as a spring. The urged engaging pin 60 converts a mounting force in the direction of arrow A into a moving force in the direction of arrow B through the effect of a tapered tip of the engaging pin 60 and (or) the roundness of the machine screw bosses 34. Then, the engaging pin 60 moves in the direction of arrow B against the urging force of the urging member 62 and passes the machine screw bosses 34. Then, the engaging pin 60 engages with a front side of the handling portion 46 oriented slightly inward than the direction of arrow A.

As shown in FIG. 6, when the recording tape cartridge 10 (case 12) is further pushed in, the pushing force makes the engaging pin 60 move the handling portion 46 backward. In other words, the pin 60 relatively moves the handling portion 46 backward with respect to the case 12 mounted in the direction of arrow A.

Then, the door 40 moves backward with the guide pins 42 being guided by the first guide grooves 48 and the guide pin 44 being guided by the second guide groove 50. At this time, the guide pin 44 rotates around the axis of the guide pins 42 clockwise when viewed from above. That is, the door 40 moves backward so as to go around the outside of the pin seats 24 and the reel 14 while rotating around the guide pins 42, or the one end portion of the door moves outside the inclined side walls 16B and 18B of the case 12 along the direction of arrow A, to open the opening 20.

As shown in FIG. 7, when the guide pins 42 engage with the back ends of the first guide grooves 48, the opening 20 is completely open. In this state, backward movement of the door 40 is restrained, and the door 40 is placed between the tongues 30 and 32 outside the case 12 substantially in parallel with the inclined side walls 16B and 18B. At this time, the handling portion 46 is oriented slightly outward due to the above-described clockwise rotation.

The handling portion 46 has a front side, which is oriented slightly outward than the direction of arrow A or a tapered end portion. The front side or end portion works to convert the mounting force in the direction of arrow A into the moving force in the direction of arrow B. With this conversion of the direction of the force, the engaging pin 60 of the drive moves in the direction of arrow B against the urging force of the urging member 62. Then, the engaging pin 60 passes the handling portion 46 and reaches a position at which the engaging pin 60 can engage with the back side of the handling portion 46 (a position shown by a dotted arrow in FIG. 7).

In this state, the recording tape cartridge 10 is positioned in the drive. Then, the drawing device of the drive enter the case 12 through the opened opening 20. The drawing device draws out the leader pin 22 being positioned and held in the pin seats 24 to set the leader pin 22 in a winding reel. When the winding reel and the reel 14 are synchronously rotated, the magnetic tape T is sequentially drawn out from the case 12 and is wound around the winding reel. In this state, information is recorded or reproduced by a read-write head, or the like, disposed along a predetermined tape path.

When the magnetic tape T is wound back onto the reel 14 and the recording tape cartridge 10 is ejected from the drive, the recording tape cartridge 10 is released from the positioned state. An ejecting mechanism (not shown) moves the cartridge 10 in the direction opposite to the direction of arrow A. Along with this ejecting operation, the engaging pin 60 engages with the back side of the handling portion 46 of the door 40 and moves forward or relatively moves forward the door 40 with respect to the case 12.

While the guide pins 42 guided by the first guide grooves 48 move forward, the guide pin 44 is guided by the second guide groove 50. The door 40 rotates around the axis of the guide pins 42 counterclockwise when viewed from above. That is, the door 40 moves forward so as to go around the outside of the pin seats 24 and the reel 14 while rotating around the guide pins 42. When the guide pins 42 engage with the front ends of the first guide grooves 48, forward movement of the door 40 is restrained and the door 40 returns to its initial position to close the opening 20.

Along with ejection of the recording tape cartridge 10, the ejecting force is converted into the moving force by the back surface of the handling portion 46, the inclined surfaces of the machine screw bosses 34 and/or the tapered end portion. The ejecting force is in a direction opposite to the direction of arrow A, and the moving force is in the direction of arrow B. With this conversion of the direction of the force, the engaging pin 60 passes the handling portion 46 and the machine screw bosses 34, and therefore does not interfere with the operation of ejecting the recording tape cartridge 10.

It should be noted that, instead of the engaging pin 60 included in the opening/closing member, the drive may include a plate spring which can flexibly deform in the direction of arrow A and in the direction opposite to the direction of arrow A. When the plate spring engages with the machine screw bosses 34 or the handling portion 46 whose movement is being restrained, the plate spring bends and can pass the machine screw bosses 34 and the handling portion 46. The plate spring may engage with the front side or the bask side of the handling portion 46 of the door 40 to open or close the opening 20. Alternatively, the engaging pin 60 may be brought into or out of a track of movement of the handling portion 46 by a motive power of, for example, a motor.

Since the opening 20 is formed by notching the corner portion of the rectangular case 12 at the side coming first when the cartridge 10 is mounted, the open plane of the opening 20 is oriented in the directions of arrows A and B, or is inclined with respect to the direction of arrow A. The drawing device of the drive can access the leader pin 22 from the front side of the case 12 in the direction of arrow A, and it need not access from a position (in the direction of arrow B) outside the peripheral walls (side walls) 16A and 18A in the direction of arrow B.

Therefore, in the drive, a distance of a path for drawing out the magnetic tape T can be minimized. Further, there is no need of a driving mechanism for moving the drawing device so as to go around from the side of the case 12 in the direction of arrow B, and therefore, a size reduction and a cost reduction can be accomplished.

Further, while the one end portion of the door 40 is guided by the first guide grooves 48 and the second guide groove 50 to move in the direction of arrow A or in the direction opposite to the direction of arrow A, the door 40 rotates around the guide pins 42 disposed at the one end, to open or close the opening 20. In other words, the door 40 moves so as to go around the outside of the leader pin 22 (the pin seats 24) and the reel 14 while it rotates around the guide pins 42 to open or close the opening 20.

Therefore, a range of movement (a track of movement) of the door 40 does not extend beyond the portion of the case 12 which is notched for forming the opening 20, or an outline area of the rectangular case 12 when the notched portion is not provided. That is, using this recording tape cartridge 10, a space in the drive for accommodating the recording tape cartridge 10 is small. Further, the track of movement of the door 40 does not interfere with the leader pin 22 or the reel 14 in the case 12.

Moreover, the engaging pin 60 of the drive engages with the handling portion 46 of the door 40 to move the door 40 as described above to open or close the opening 20 simply though the operation of mounting or dismounting the recording tape cartridge 10 (the case 12) in or from the drive. Therefore, the engaging pin 60 simply needs to be positioned on the track of movement of the handling portion 46, which is a straight line along the direction of arrow A, and thus its structure is simple. Further, since the one end portion of the door 40 moves outside the inclined side walls 16B and 18B of the case 12, there is no need of providing an opening such as a slit for exposing the handling portion 46, which is provided at the one end portion of the door 40, to the outside so as to movable outward from the case 12. Therefore, dust-tightness is increased with the simple structure.

As described above, in the recording tape cartridge 10 according to this embodiment, the opening 20, which is adapted to minimize the distance of the path for drawing out the magnetic tape T, can be opened or closed with the door 40, which allows to reduce the space in the drive for accommodating the recording tape cartridge 10, without interfering with the reel 14 and the leader pin 22. Further, the structure of the engaging pin 60, which serves as the opening/closing device (the opening/closing member) for operating the door 40 to open or close the opening 20, can be simplified.

Furthermore, when the distance of the path for drawing out the magnetic tape T is minimized as described above, a distance of a path of the magnetic tape T is also shortened. This allows reducing a contact abrasion between the magnetic tape T and a tape guide such as a rotatably supported roller.

Moreover, since the opening 20 is formed by notching the corner portion of the case 12 to be oriented in the directions of arrows A and B, a range of accessible directions of the drawing device (such as a hook) to the leader pin 22 is widened. Therefore, a range of possible positions of the leader pin 22 in the case 12 is widened. As described above, the track of movement of the door 40 does not interfere with a practically possible position of the leader pin 22. This increases a degree of freedom in designing the drive.

In addition, since the door 40 is a separate member from the leader pin 22 to be drawn out from the case 12, it is structured so that it cannot be removed from the case 12, by including the guide pins 42 and 44, and the first and second grooves 48 and 50. In other words, the door 40 does not easily come off from the case 12 with an impact caused, for example, when the recording tape cartridge 10 is dropped. When the magnetic tape T is not used, the leader pin 22 is accommodated in the case 12 in a tightly closed state, whose opening 20 is closed with the door 40, and therefore, the leader pin 22 is not likely to be damaged or contaminated. Therefore, it does not affect drawing or running of the magnetic tape T in the drive, and does not damage the magnetic tape T.

Further, since the door 40 is operated by the engaging pin 60 of the drive both for opening and closing the opening 20, there is no need of an urging device for urging the door 40 in the direction for closing the opening 20, nor a space for disposing the urging device. Therefore, a relatively large area of the front-right corner portion of the case 12 can be notched for forming the opening 20, and the size of the opening can be increased. In addition, the peripheral walls 16A and 18A and the inclined side walls 16B and 18B of the case 12 can be thickened to increase strength of the case 12. Particularly, when the peripheral walls 16A and 18A and the inclined side walls 16B and 18B are thickened at areas in the vicinity of the opening 20, strength of areas around the pin seats 24 can be increased, and displacement caused by a drop impact, or the like, can be prevented. The pin seats 24 have positions for holding (positioning) the leader pin 22, which are most important in functional terms of the recording tape cartridge 10 for the leader pin 22 should be correctly anchored by the drawing device when the magnetic tape T is drawn out.

Further, during a process of the door 40 opening or closing the opening 20, the handling portion 46 does not project beyond the outline area of the case 12 (toward a side in the direction of arrow B from the tongues 30 and 32). Therefore, unintended operation of the handling portion 46 is prevented. The process of the door 40 opening or closing the opening 20 includes open and closed states.

Figure 9A:
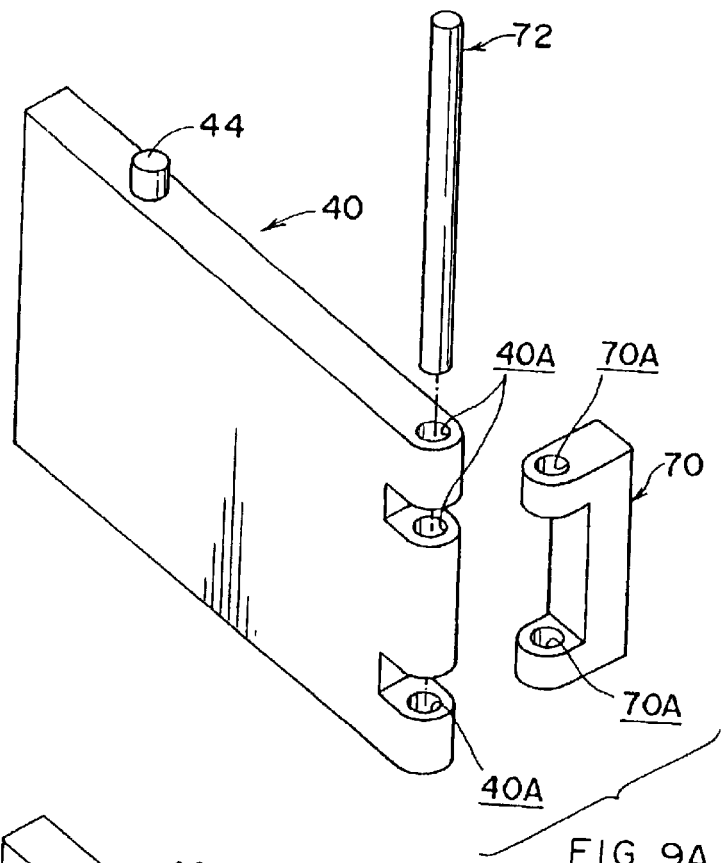
FIG. 9A is an exploded perspective view showing a modification of the door of the recording tape cartridge according to the embodiment of the invention.
Figure 9B:
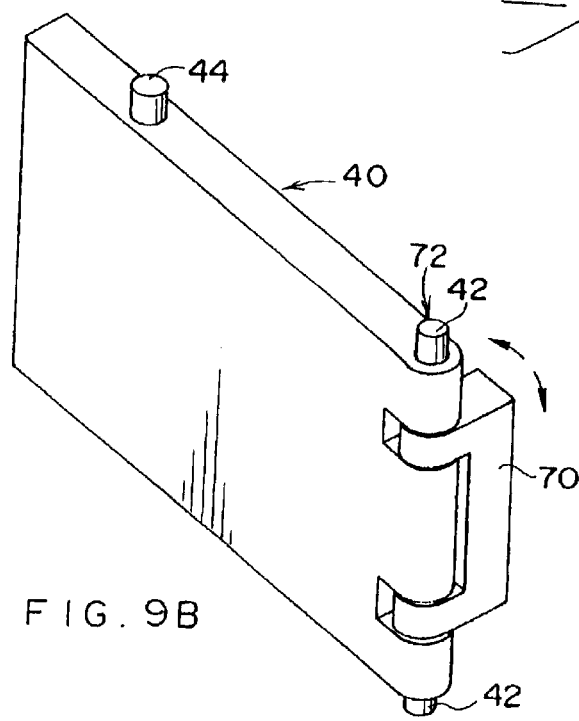
FIG. 9B is a perspective view showing the door of FIG. 9A in an assembled state.
Figure 10:
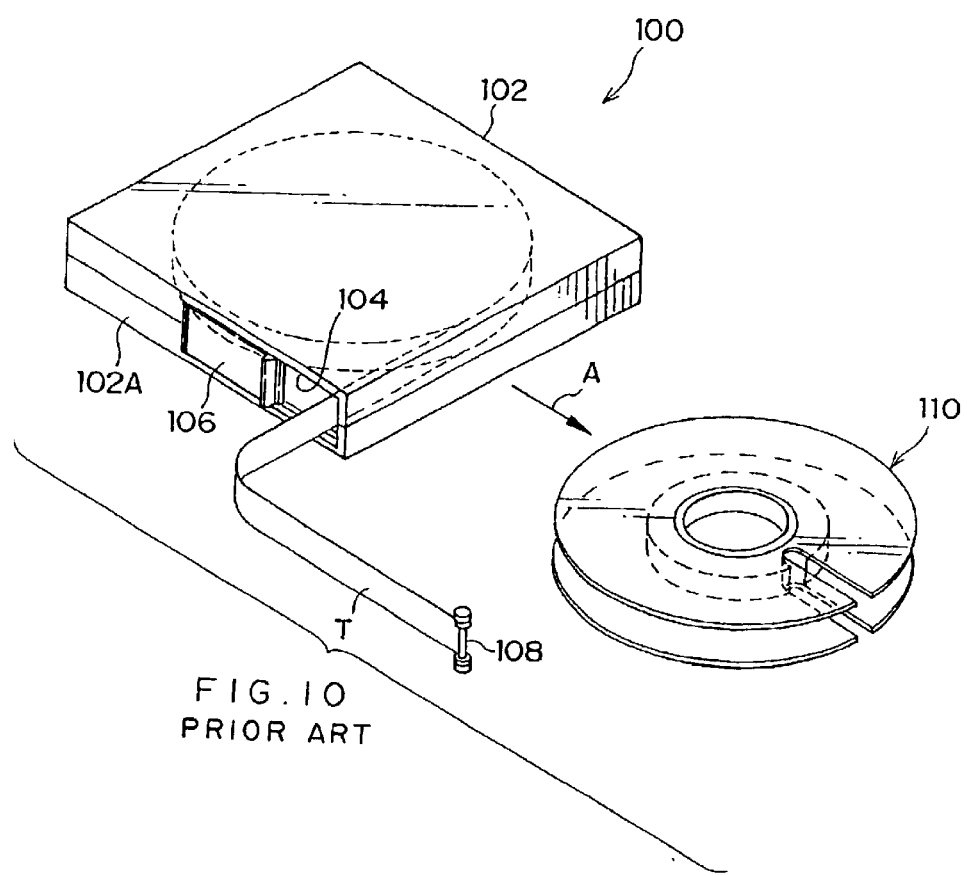
FIG. 10 is a perspective view showing an overall structure of a conventional recording tape cartridge.
Figure 11:
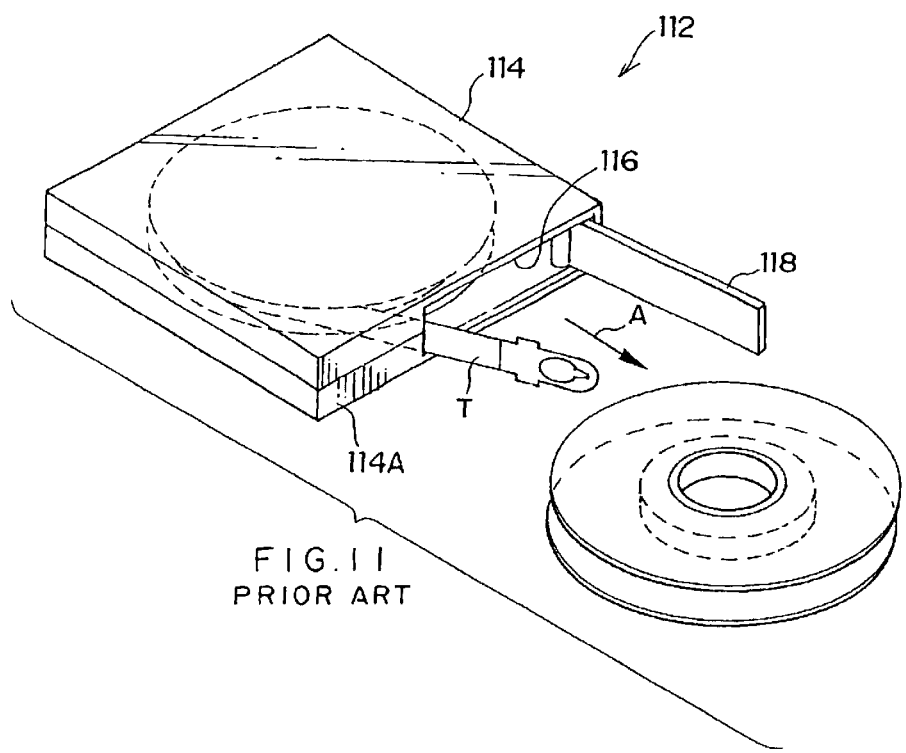
FIG. 11 is a perspective view showing an overall structure of a conventional recording tape cartridge.
Figure 12:
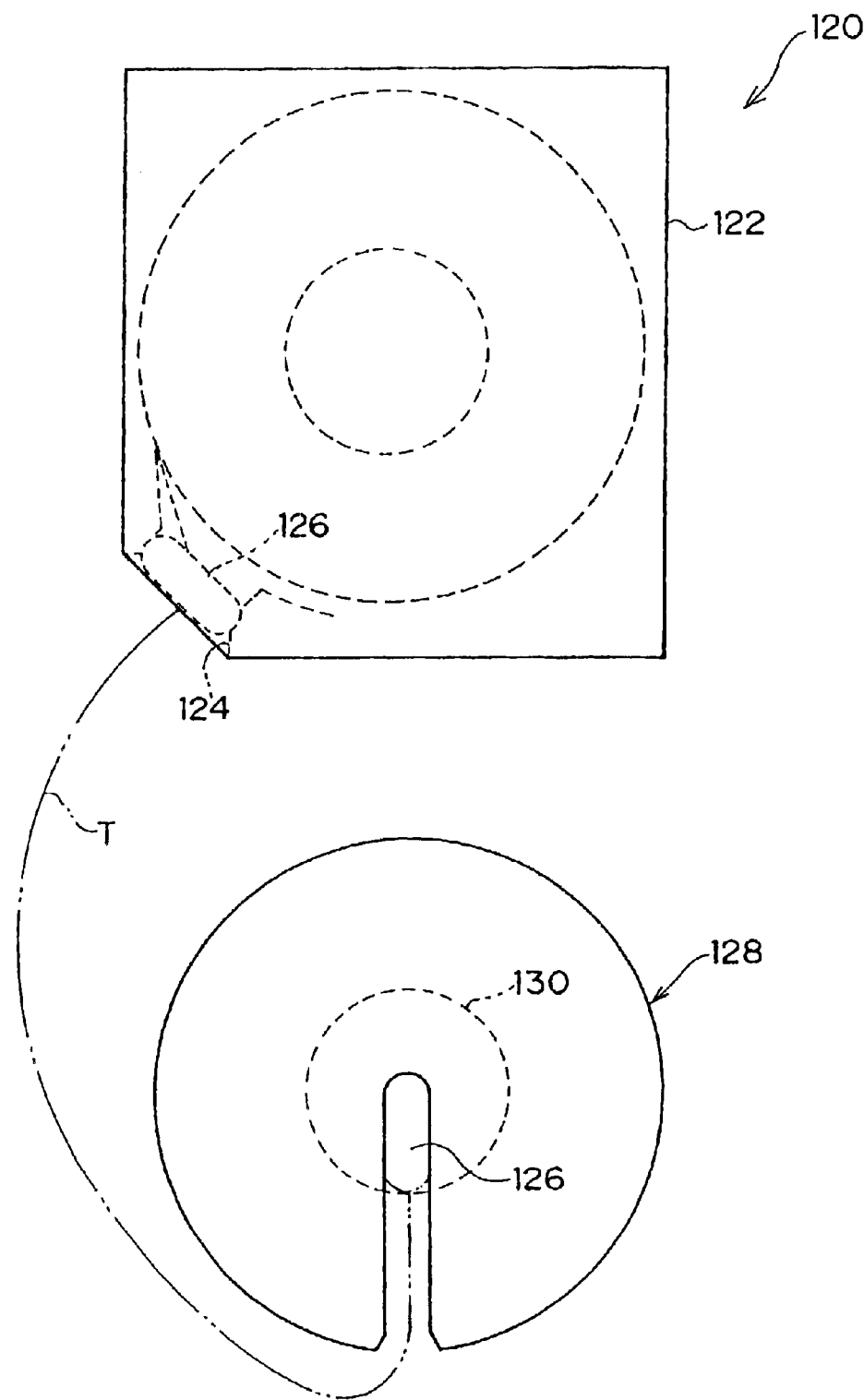
FIG. 12 is a perspective view showing an overall structure of a conventional recording tape cartridge.

It should be noted that, while the handling portion 46 of the door 40 is operated by the engaging pin 60 of the drive in the directions for opening or closing the opening 20 in the above-described embodiment, this is not intended to limit the invention. For example, as shown in FIGS. 9A and 9B, instead of the handling portion 46, a handling portion 70, which is pivotably supported by the door 40, may be provided. The handling portion 70 includes shaft holes 70A in which a shaft member 72 is fitted with a play, and the handling portion 70 is pivotably supported at one end portion of the door 40 with the shaft member 72 being fitted in the shaft holes 70A and shaft holes 40A provided in the one end portion of the door 40. Both ends of the shaft member 72 project respectively from the upper and lower ends (in the width direction) of the door 40, when assembled, to form the guide pins 42. A range of pivot of the handling portion 70 is limited within ±10° with respect to the direction of arrow B. In this structure, even when the door 40 changes its orientation along with the operation of opening or closing the opening 20, the handling portion 70 is operated by the engaging pin 60 without changing its orientation. This structure is often used when the handling portion 70 is grasped to be moved by the opening/closing device of the drive.

In the above-described embodiment, the door 40 is guided by the first and second guide grooves 48 and 50 to move backward or forward while rotating around the axis of the guide pins 42 to open or close the opening 20. However, this is not intended to limit the invention, and, for example, the door 40 may not include the guide pin 44 and the case 12 may not include the second guide groove 50. In this case, to open the opening 20, the door 40 is rotated around the axis of the guide pins 42 clockwise when viewed from above, with a middle portion of the door 40 being slid by the front ends of the inclined side walls 16B and 18B (the back edge of the opening 20), and to close the opening 20, the door 40 is rotated around the axis of the guide pins 42 counterclockwise when viewed from above, with the middle portion of the door 40 being slid by the machine screw bosses 34, which serve as sliding walls.

Further, as a guiding device for guiding the door 40 to rotate around the axis of the guide pins 42 to close the opening 20, instead of the second guide groove 50 and the machine screw bosses 34, a stepped portion corresponding to the shape of the second guide groove 50 may be provided behind the tapered surfaces which are formed at the tongues 30 and 32 for guiding the leader pin 22 into the case 12. In addition, by determining the position of the guide pin 44 so that the stepped portion and the back end of the second guide groove 50 are not formed between the inclined side walls 16B and 18B and the machine screw bosses 34, strength against drop (an endurance strength when the machine screw bosses 34 experience a drop impact) is increased. Moreover, instead of the guide pins 42 and the first guide grooves 48, ribs may be provided along the direction of the arrow A at edges of the tongues 30 and 32 on the side in the direction of arrow B.

In the above-described embodiment, the recording tape cartridge 10 does not include a locking device for locking the door 40 in the position for closing the opening 20. However, the cartridge 10 may include a locking device which releases a locked state of the door 40 along with the operation of mounting the cartridge 10 in the drive, and recovers the locked state along with the operation of ejecting the cartridge 10 from the drive.

In the above-described embodiment, the magnetic tape T is used as the recording tape. However, this is not intended to limit the invention, and the recording tape may be any information recording/reproducing medium in a form of a long tape which can be used for recording information and reproducing the recorded information. The recording tape cartridge according to the invention can be applied to recording tapes of various recording/reproducing types.

In the recording tape cartridge of the invention, when the recording tape is not used, the opening is closed with the shielding member to block dust, or the like, entering the case. This prevents adhesion of dust, or the like, to the recording tape wound around the reel accommodated in the case.

When the recording tape is used, the recording tape cartridge (the case) is mounted in the drive. With the mounting operation, the opening/closing member of the drive engages with the handling portion (the one end portion of the shielding member), and the handling portion engaging with the opening/closing member moves outside the side wall of the case along the direction in which the case is mounted in the drive (relatively moves in a direction opposite to the mounting direction).

Thus, the one end portion of the shielding member moves along the mounting direction to open the opening, and the leader member is drawn out through the opening. The leader member is guided by the drawing device of the drive to the winding reel, and the recording tape is sequentially drawn out from the case and is wound around the winding reel for recording or reproduction of information by a read-write head, or the like, disposed along a predetermined tape path.

After the recording tape is used, the one end portion of the shielding member moves in a direction opposite to the direction for opening the opening, and returns to its initial position for closing the opening. The movement of the shielding member in the direction for closing the opening may be effected, for example, by an urging force of the urging device such as a spring, or may be effected by the opening/closing member of the drive.

It should be noted that the shielding member of the invention may be any member capable of closing the opening, such as a door, a lid, a shutter and a card panel. Here, "engaging" refers to a state in which the opening/closing member of the drive keeps the handling portion from moving relatively to the drive in order to effect relative movement of the handling portion or the shielding member with respect to the case through the operation of mounting the case in the drive.

In the recording tape cartridge having the above-described structure, the handling portion may be operable by the opening/closing device of the drive both for opening and for closing the opening.

In this structure, since the shielding member is operated by the opening/closing device (the opening/closing member) of the drive when the opening is opened or closed, there is no need of an urging member for urging the shielding member in the direction for closing the opening. Since there is no need of a space for disposing the urging device, the size of the opening can be increased. In addition, the thicknesses of the side wall of the case can be increased, thereby increasing strength of the case. It should be noted that, in this structure, a locking device may be provided for locking the shielding member in a position for closing the opening when the opening is closed. Further, the opening/closing device of the drive may, for example, grasp the handling portion. Alternatively, the opening/closing device may include the opening/closing member for engaging with one of the opposite sides of the handling portion for opening or closing the opening through the operation of mounting or ejecting the case into or from the drive.

In the recording tape cartridge having any of the above-described structures, if at least a portion of the side wall of the case, which is within a range of movement of the one end portion of the shielding member, is offset inward, so that the shielding member and the handling portion do not project beyond the outline area of the case, the shielding member and the handling portion do not project beyond the outline area of the case when the opening is opened or closed, and an unintended operation of (contact with) the handling portion is prevented.

The handling portion of the shielding member may be integrated with, or may be pivotable with respect to the shielding member. Since the shielding member, which moves with rotating, changes its orientation (angle) with respect to the drive during the operation for opening or closing the opening, as described above, the handling portion integrally provided to the shielding member is preferably oriented in the above-described mounting direction or inward than the mounting direction when the opening is closed. On the other hand, the handling portion pivotably provided to the shielding member may maintain a state in which the handling portion is substantially perpendicular (within 10 degrees for each side with respect to the perpendicular direction) to the side wall of the case (in the mounting direction). It should be noted that the structure in which the handling portion is pivotably provided to the shielding member is often applied to a case in which the handling portion is grasped by the opening/closing device of the drive to be operated (moved).

In the recording tape cartridge having any of the above-described structures, it is preferable to simplify the structure such that, for opening the opening, an end of the side wall of the case at the side of the opening (an edge of the opening) contacts the shielding member to slide it so that it rotates around the one end portion thereof, and for closing the opening, the sliding wall provided outside the end of the side wall of the case at the side of the opening contacts the shielding member to slide it so that it rotates around the one end portion thereof. Particularly, if the machine screw boss for joining the upper and lower cases forming the case serves as the sliding wall, the structure is even more simplified and strength of the case, comprising the separated upper and lower cases, at areas in the vicinity of the opening is increased.

As the guiding device for guiding the shielding member in a rotating direction, instead of or in addition to one of or both of the end of the side wall at the side of the opening of the case and the sliding wall (the machine screw boss), a cam groove (a guide groove) for guiding the guide pin, which projects from the shielding member at a site other than the one end portion thereof, in each of the rotating directions may be provided.

As the guiding device for moving the one end portion of the shielding member along the mounting direction, a restraining wall, or the like, may be disposed so as to sandwich the shielding member between itself and the cam groove provided outside the side wall of the case and/or the side wall. In a structure in which the opening/closing device of the drive grasps the handling portion, these guiding devices may not be included.

As described above, in the recording tape cartridge according to the invention, the opening, which is adapted to minimize a distance of a path for drawing out the recording tape, can be opened or closed with the shielding member, which allows to reduce a space in the drive for accommodating the cartridge, without interfering with the reel and the leader member. Further, the invention has an excellent effect that the structure of the opening/closing device of the drive, which operates the shielding member to open or close the opening, can be simplified.

What is claimed is:

1. A recording tape cartridge comprising:
    a rectangular case for rotatably accommodating a single reel, around which a recording tape is wound;
    an opening formed by notching a corner portion of the case at a side coming first when the case is mounted in a drive, through which a leader member attached at an end of the recording tape is drawn out;
    a shielding member disposed at the case, whose one end portion moves outside a side wall of the case along a mounting direction, in which the case is mounted in the drive, to open or close the opening; and
    a handling portion disposed at the one end portion of the shielding member and movable along the mounting direction while engaging with an opening/closing member of the drive through an operation of mounting the case in the drive.

2. The recording tape cartridge according to claim 1, wherein the opening/closing member of the drive comprises an engaging pin.

3. The recording tape cartridge according to claim 1, wherein the handling portion of the shielding member comprises a shaft hole, and the handling portion is pivotably supported by the shielding member with a shaft member fitted with a play in the shaft hole of the handling portion and a shaft hole provided in the one end portion of the shielding member.

4. The recording tape cartridge according to claim 3, wherein a range of pivot of the handling portion is within 10 degrees with respect to a direction perpendicular to the mounting direction.

5. The recording tape cartridge according to claim 1, wherein the shielding member substantially comprises a door, the door comprising a pair of first upper and lower guide pins corresponding to upper and lower portions of the case.

6. The recording tape cartridge according to claim 5, wherein the door further comprises a second guide pin at an upper side thereof.

7. The recording tape cartridge according to claim 6, wherein the door and the guide pins comprise mutually different materials.

8. The recording tape cartridge according to claim 5, wherein the door comprises a material having substantially higher abrasion resistance and a lower friction coefficient than the case.

9. The recording tape cartridge according to claim 5, wherein the case comprises a peripheral wall and the opening is defined by ends of the peripheral wall of the case.

10. The recording tape cartridge according to claim 9, wherein a first machine screw boss is disposed at one of the ends of the peripheral wall of the case, the other of the ends of the peripheral wall comprises an end of an inclined wall which is formed by inwardly offsetting the peripheral wall at a middle portion thereof, and a second machine screw boss is disposed in the vicinity of the end of the side wall.

11. The recording tape cartridge according to claim 10, further comprising a restraining wall formed at an inner side of the case and smoothly integrated with the peripheral wall.

12. The recording tape cartridge according to claim 10, wherein the case comprises upper and lower cases, and each of the upper and lower cases comprises a first guide groove formed along the mounting direction at an area on a tongue outside an inclined side wall, the first guide groove receiving one of the guide pins of the door to guide it along the first guide groove.

13. The recording tape cartridge according to claim 12, wherein the upper case further comprises a second guide groove formed at the tongue in the vicinity of the opening, one end of the second guide groove is located in the vicinity of the first machine screw boss, the other end of the second guide groove is located on the inside of the end of the first guide groove in the vicinity of the opening, and the second guide groove receives another guide pin of the door to guide it.

14. The recording tape cartridge according to claim 13, wherein each of the first and second guide grooves comprises a bottom portion, and a thickness of the bottom portion is from 0.5 to 1 mm.

15. The recording tape cartridge according to claim 13, wherein a clearance in a width direction of each groove when centers of the guide pins are aligned with centerlines of the first and second guide grooves is from 0.05 to 0.4 mm for each side.

16. The recording tape cartridge according to claim 13, wherein a clearance in a width direction of each groove when centers of the guide pins are aligned with centerlines of the first and second guide grooves is 0.2 mm for each side.

17. The recording tape cartridge according to claim 9, wherein the case comprises upper and lower cases, each of the upper and lower cases comprises a bottom plate, and one of corners of the bottom plate extends beyond a straight line connecting the ends defining the opening to be formed as a tongue which is substantially parallel to the straight line.

18. The recording tape cartridge according to claim 17, wherein one of the ends of the peripheral wall of the case comprises an end of an inclined side wall which is formed by inwardly offsetting the peripheral wall at a middle portion thereof, and the inclined side wall includes a substantial circular arc shape having one of sides of the tongue as a tangent line.

19. The recording tape cartridge according to claim 17, wherein a first machine screw boss is disposed at one of the ends of the peripheral wall of the case, the other of the ends of the peripheral wall comprises an end of an inclined wall which is formed by inwardly offsetting the peripheral wall at a middle portion thereof, and a second machine screw boss is disposed in the vicinity of the end of the side wall, and wherein the upper and lower cases are joined and fixed to each other via the first and the second machine screw bosses.

20. The recording tape cartridge according to claim 19, wherein the case substantially comprises a polycarbonate material.

21. The recording tape cartridge according to claim 17, wherein a clearance between each of upper and lower ends of the door and each of the tongues is from 0.05 to 0.2 mm for each side.

* * * * *